United States Patent [19]

Green

[11] Patent Number: 5,556,903
[45] Date of Patent: Sep. 17, 1996

[54] POLYBROMINATED PHENYLPHOSPHATE FLAME RETARDENT FOR ENGINEERING THERMOPLASTIC COMPOSITIONS

[75] Inventor: Joseph Green, East Brunswick, N.J.

[73] Assignee: FMC Corporation, Philadelphia, Pa.

[21] Appl. No.: 341,806

[22] Filed: Nov. 18, 1994

Related U.S. Application Data

[63] Continuation of Ser. No. 123,831, Sep. 20, 1993, abandoned, which is a continuation-in-part of Ser. No. 541,571, Jun. 21, 1990, abandoned, which is a continuation-in-part of Ser. No. 360,641, Jun. 11, 1989, abandoned, which is a continuation-in-part of Ser. No. 169,786, Mar. 18, 1988, abandoned.

[51] Int. Cl.$^6$ .................................................. C08K 5/523
[52] U.S. Cl. ........................................... 524/142; 524/412
[58] Field of Search ..................................... 524/142, 412

[56] References Cited

U.S. PATENT DOCUMENTS

| | | | |
|---|---|---|---|
| 3,864,428 | 2/1975 | Nakamura et al. | 525/67 |
| 3,912,792 | 10/1975 | Touval | 524/142 |

FOREIGN PATENT DOCUMENTS

| | | | |
|---|---|---|---|
| 3521388 | 12/1986 | Germany | 524/142 |
| 2089350 | 6/1982 | United Kingdom | 524/142 |

*Primary Examiner*—Kriellion S. Morgan
*Attorney, Agent, or Firm*—Richard E. Elden; Patrick C. Baker; Robert L. Andersen

[57] ABSTRACT

Flame retarding resin compositions having good thermal stability and good impact resistance. The composition comprises a thermoplastic resin selected from the group of polycarbonate, polybutylene terephthalate, polyethylene terephthalate, and blends and alloys of polycarbonate with polybutylene terephthalate, polyethylene terephthalate and acrylonitrile-butadiene-styrene, and a flame retarding amount of a melt-blendable, solid polybrominated triphenyl phosphate ester selected from tris(dibromophenyl)phoshate and bis(tribromophenyl)phenylphosphate, and less than 5% antimony oxide or halogenated organic.

9 Claims, No Drawings

POLYBROMINATED PHENYLPHOSPHATE FLAME RETARDENT FOR ENGINEERING THERMOPLASTIC COMPOSITIONS

RELATED APPLICATIONS

This application is a continuation of application Ser. No. 08/123,831 filed Sep. 20, 1993, now abandoned; which is a continuation-in-part of application Ser. No. 07/541,571, filed Jun. 21, 1990, now abandoned; which is a continuation-in-part of application Ser. No. 07/360,641 filed Jun. 11, 1989, now abandoned; which is a continuation-in-part of application Ser. No. 07/169,786, filed Mar. 18, 1988, now abandoned.

FIELD OF INVENTION

The present invention is a group of flame retardant engineering thermoplastic compositions containing a polybrominated triphenylphosphate and less than 5% antimony oxide.

BACKGROUND OF INVENTION

Thermoplastic resins can be modified by a number of additives which act as flame retardants to hinder ignition or reduce flame spread. These flame retardants frequently must be employed in large quantities and processed at elevated temperatures, resulting in the degradation of the properties of thermoplastic polymers. Some flame retardants are difficult to disperse and to process into the resin, particularly the polymeric additives.

Chlorinated flame retardant additives such as chlorinated paraffins are frequently used, primarily because of their low cost. However, the chlorinated flame retardants generally have poor thermal stability. Chlorinated flame retardants with good thermal stability are frequently high cost additives. Thermoplastics using them often require the use of up to 15% by weight antimony oxide as a synergist.

Antimony oxide has severe limitations when used as a halogen synergist in thermoplastics. The use of high concentrations of antimony oxide in thermoplastics frequently leads to "after-glow" after flame extinguishment. The fine powder dusts readily during handling. It is recommended that breathing the dust be avoided. Antimony oxide has caused lung tumors in laboratory inhalation studies with animals. Further, in polyethylene terephthalate, polybutylene terephthalate and polycarbonate resins, antimony oxide acts as a depolymerization catalyst.

Generally, between 3 and 8% w/w antimony oxide is used as a halogen synergist in thermoplastics. In polypropylene up to 15% w/w antimony oxide is sometimes necessary for optimum flame retardancy. It has been found that oxide substantially degrades the physical properties of engineering thermoplastics, for example, the impact resistance. In addition, high loadings of the white antimony oxide make it impossible to make a product with deep rich colors.

Bromine compounds are known to be about twice as effective a flame retardant as chlorine compounds. Bromoparaffins are limited in their use to polyvinylchloride and polyurethane foam because of their poor heat stability. However, brominated aromatics have emerged to fill the needs of more specialized thermoplastic polymers. Examples are poly(tribromostyrene) which is marketed under the tradename Pyrochek 68 PB by Ferro Corporation, poly(dibromophenylene oxide), bis(tetrabromophthalimido)ethane, decabromodiphenyl oxide, bis(tribromophenoxy) ethane and brominated polycarbonate oligomers which are marketed under the tradenames BC-58 and BC-52 by Great Lakes Chemical. These flame retardants offer improved thermal stability and chemical resistance over the brominated paraffins. However, each of these compounds is limited in its cost effective application to special resin compositions as a result of their effect on physical properties, toxicity of brominated furans and processability. Also, in some applications over 5% w/w antimony oxide must be used to attain excellent flame retarding qualities.

Phosphorus compounds such as phosphate esters, with or without halogen are also used as flame retardant additives. Typical compounds are the alkyl, alkaryl and triaryl phosphates used as plasticizers in PVC, and the halogenated alkylphosphates and phosphonates used in urethane foams, phenolics, acrylics and epoxies. Low thermal stability, volatility and the tendency to plasticize limit the use of these additives. Phosphorus compounds are about three times more effective than bromine compounds.

U.S. Pat. Nos. 3,912,792 and 4,021,406 to Touval teach a three-part flame retarding composition for organic polymers consisting of from 0.5% to 20% of a tris(halophenyl)phosphate based on the combined weight of one to twelve parts by weight of a halogen-containing organic having a volatization temperature of more than 200° C. and one part by weight antimony oxide. When the polymer is other than polypropylene, the flame retarding composition must also contain sulfur. The Examples and Table I in the patents teach that there must be at least 17 parts by weight antimony oxide per 5 parts by weight tris(halophenyl)phosphate to provide flame retardancy (together with 50 parts by weight halogen-containing organic).

Further, the patent teaches that tris(2,4,6-tribromophenyl)phosphate does not significantly reduce the flammability of polypropylene at the relatively low concentrations employed unless both antimony oxide and halogen-containing organic compound are present.

SUMMARY OF THE INVENTION

The present invention provides flame retardant engineering thermoplastic compositions comprising a) a resin selected from the group consisting of polycarbonate, polybutylene terephthalate, polyethylene terephthalate, and blends and alloys of polycarbonate with polybutylene terephthalate, polyethylene terephthalate and acrylonitrile-butadiene-styrene (ABS), and b) a flame retarding amount of a melt-blendable solid polybrominated triphenyl phosphate ester, the ester having a molar ratio of bromine to phosphorus of 6:1. The resulting thermoplastic composition is thermally stable, is not subject to plateout, has good impact properties, and good processability. Optionally, the compositions contain less than 5% by weight either antimony oxide supplied as sodium antimonate or as antimony oxide or additional halogenated organic compound taught by the prior art.

DETAILED DESCRIPTION

It is desirable that each phenyl radical contains either two or three bromine atoms. For example, if the ester is to be manufactured by the reaction of brominated phenols and phosphorus oxychloride, the phenols are primarily either 2,4-dibromophenol, or 2,4,6-tribromophenol. Preferably, the ester will be either tris(2,4-dibromophenyl)phosphate or a bis(tribromophenyl)phenyl phosphate such as bis(2,4,6-tribromophenyl)phenyl phosphate. A product produced from a mixture of esters usually is a liquid and is not desirable.

Until now most brominated flame retardants used in engineering thermoplastics were either oligomers or polymers. As a result, they had poor processability, that is, they were difficult to compound into an engineering thermoplastic resin, and the processability of the compounded formulation was poor as measured by spiral flow and melt index. As a result, injection molding was difficult, requiring higher temperatures and higher pressures resulting in an increased processing cost and an increased reject rate and often resulting in discoloration. The poor processability also affected other physical properties. High melting solid additives which are not melt-blendable affected such properties as impact strength.

Liquid additives or some low melting solids are also undesirable in that they cause juicing, and slippage during compounding resulting in the nonuniform dispersion, and also because they reduce mechanical properties even when uniformly dispersed.

It was found that the instant brominated phosphate esters have good processability in certain engineering resins, they have relatively low melting points, are melt blendable into the resins, are soluble in aromatic solvents and hence compound readily into engineering resins to give products which mold very easily because they function as processing aids, that is, they are plasticizers at processing temperature. In addition, these products have excellent thermal stability and do not discolor the resins and generally help maintain the good impact resistance of the resulting plastic products. The combination of bromine and phosphorus makes for excellent flame retardant efficiency in specific engineering resins or plastics, namely those containing oxygen in the polymer structure. In many plastics, an antimony synergist is not needed and in others it is undesirable for more than 5% w/w antimony oxide to be incorporated.

Polybromotriphenyl phosphates are known to be flame retardants for some thermoplastic resin systems. For example, U.S. Pat. No. 4,710,530 teaches a styrene modified polyphenylene ether composition containing a polybromotriphenyl phosphate as a flame retardant and no antimony oxide. Japanese Patent Publication 43/52074 discloses a flame retardant polyolefin composition suitable for melt spinning polypropylene containing a mercaptan and a polybrominated trialkylphosphate. U.S. Pat. No. 4,021,406 teaches flame retarding polypropylene consisting of a halogen-containing organic compound having a volatilizing temperature of greater than 200° C. and antimony oxide. Up to 9% antimony oxide was required to obtain a V-0 rating in the UL-94 test.

The polybrominated triphenylphosphate esters of the present invention are solids and cannot be distilled under conventional plant conditions. Consequently, it was unexpected for them to volatilize into the flame zone as do the triaryl phosphates. The polybrominated triphenylphosphates may be incorporated into the composition in amounts ranging from 1% to 50% w/w. Desirably from 2% to 30% w/w will be present when the resin is polyethylene terephthalate, polybutylene terephthalate, acrylonitrile-butadienestyrene, polycarbonate, polyurethane, polycarbonatepolybutylene terephthalate blends, polycarbonatepolyethylene terephthalate and polycarbonateacrylonitrile-butadiene-styrene blends.

The present invention is illustrated by the following nonlimiting examples. All parts and percentages herein are by weight unless otherwise indicated.

EXAMPLES

Example 1

The physical properties of tris(2,4-dibromophenyl)phosphate (TDBP) were compared with commercial brominated polystyrene (BC-58) and brominated polycarbonate oligomers (68-PB) in Table I. The exceptional thermal stability of TDBP is evident from the lack of discoloration on heating.

The compounding characteristics or processability of brominated phosphates is significantly superior compared with other flame retardants.

It was observed that TDBP blends easily into various resins in a single or twin screw extruder. Molding rates also are increased and energy requirements are lowered. These properties are possibly related to the high solubility of the brominated phosphate in aromatic polymers and anticipated from its high solubility in aromatic solvents. This is in contrast with the polymeric flame retardants which are more difficult to incorporate or compound into various resins.

A study was conducted in a Brabender Plastic-Corder® extruder. The brominated phosphate was compared with the commercial brominated polystyrene flame retardant. Various resins with and without glass were used and the temperature adjusted for the resin. When the polymeric flame retardant was added (in increments), the viscosity increased to a point and then decreased to a plateau at the original viscosity or frequently at a higher viscosity. When brominated phosphate was added in increments the viscosity decreased immediately to a plateau, at a lower viscosity than the starting viscosity.

Example 2

Tris(2,4-dibromophenyl)phosphate (TDBP), containing 60% Br was compared with a 58% bromine-containing polycarbonate oligomer marketed by Great Lakes Chemical Co. under the designation BC-58. The compositions were compounded in a Brabender mixer. Table II compares the oxygen index of the compositions prepared using GE's Lexan™ 141 polycarbonate resin and no antimony oxide. Initially at 2% Flame Retardant (1.2% Br) usage the two were equivalent (OI=28%), however, increase in OI with BC-58 was linear (slope 0.5) while the increase in oxygen index (OI) using TDBP unexpectedly was nonlinear resulting in a proportionately greater OI with each increment of IDBP. The precision of OI measurements is ±0.2.

Example 3

Tris(2,4,6-tribromophenyl)phosphate (TTBP), TDBP and BC-58 Br polycarbonate oligomer were compared as indicated in Table III. The compositions were prepared by extrusion compounding and injection molding. TDBP lowered the heat distortion temperature about 10° C. (20° F.) but the TTBP resin had the same value as the BC-58 Br polycarbonate oligomer resin. All three samples were transparent and indistinguishable from each other. The TDBP and TTBP compositions visually appeared to process easier than the BC-58 containing product. Spiral flow measurements during injection molding confirm this observation; the resin containing TDBP had significantly greater flow than BC-58. When 0.2% Teflon powder is added to the resin only 3.0% of TDBP results in a resin with a UL-94 V-0 rating.

It is remarkable that the oxygen index of the TDBP was much greater than that of BC-58 or TTBP and that the flame time was significantly less than either.

Example 4

A 1.6 mm (1/16") thick coupon of a commercial sulfonate salt polycarbonate resin had a UL-94 rating of V-0 but at 0.8 mm (1/32") the coupon dripped to give a V-2 rating. The addition of 3% solid TDBP without antimony oxide present rendered the product V-0 at 1/32 inch thick (Table IV) with a much higher OI. The dramatic effect of TDBP is demonstrated in the table. This is wholly unexpected in view of U.S. Pat. No. 3,912,792 to Touval which teaches antimony oxide must be present. The improvement melt index of the sample with 3% TDBP indicates the improved processability.

Example 5

The surprising efficacy of the claimed solid polybrominated phosphate ester in polycarbonate alloys and blends in the absence of antimony oxide is shown in Tables V and VI. Table V demonstrates the superior effect of TDBP on flame retardancy (OI) in a polycarbonate/polyethylene terephthalate polyester (PET) alloy with other commercial brominated compounds. The high melt index of the TDBP compositions showed its unexpectedly greater processability. On the other hand, the discoloration of the brominated polystyrene indicated undesirable decomposition. Table VI shows the remarkable effect of TDBP on OI and flame time in glass filled polycarbonate/PET alloy without the presence of antimony oxide taught by Touval.

The results shown in both Table V and VI are surprising in view of Touval's teaching that both antimony oxide and other halogenated organics are necessary.

Example 6

Mineral-filled polybutylene (PBT) resin (Valox 745) was flame retarded with TDBP. An increasing oxygen index with increasing concentration of TDBP was observed. At 16% TDBP a UL-94 V-0 product was obtained even without antimony oxide! The equivalent BC-58 containing resins burned as shown in Table VII demonstrating its need for antimony oxide. TDBP unexpectedly obviates the need for antimony compounds in this plastic contrary to the teaching of Touval.

Example 7

With 30% glass filled PBT, the 10% TDBP formulation required the use of a small amount of antimony oxide for a VO product. Teflon 6C fibrous powder was used in these studies as a drip inhibitor. The example compares the control (no additives), a brominated polystyrene (1), brominated polycarbonate (2) and TDBP (Table VIII).

The Pyrochek 68PB brominated polystyrene (1) was unsuitable as it resulted in thermal degradation (discoloration) and physical property degradation as indicated by the much lower (0.80) notched Izod impact, tensile strength (11,600) and flexural strength (20,900). The BC-58 brominated polycarbonate (2) resulted in a product with poor processability as shown by the reduced melt index and significantly reduced spiral flow. The TDBP brominated phosphate provided a product with an excellent balance of properties and processability and comparable with virgin resin (the control with no additives).

Extrusion compounding tests of the four resins with a twin screw extruder showed the excellent processability of the TDBP resin by the torque values. The low viscosity and low extruder torque of the TDBP resin indicated superior moldability (Table VIII).

The resin containing TDBP had the lowest viscosity and lowest torque value. Mechanical energy data also show that this resin will require the least energy (25% less than the resin containing BC-58) at the high shear rates used in injection molding.

Example 8

A glass-filled polybutylene terephthalate resin (Valox 420) was compared with TDBP and BC-58, a brominated polycarbonate oligomer, with the results presented as Table IX. Another commercial product is decabromodiphenyl oxide, not shown. The latter product blooms in a PBT formulation but TDBP was shown not to bloom even when aged at 175° C. It is most unexpected that the heat distortion temperature of TDBP formulations to be essentially the same as those of the PC/Brominate PC oligomer.

Example 9

An ABS composition was prepared according to the formulation of Table IV of U.S. Pat. No. 4,021,406 to Touval to emphasize the problems of additives in PC-ABS blends. The compositions were extruded and injection molded.

It was anticipated the composition of U.S. Pat. No. 4,021,406 would have a poor impact resistance because perchloropentacyclodecane is a nonmelting pigment and its high concentration plus the high concentration of antimony oxide pigment significantly reduced the impact rating. This was confirmed as shown in Table X which compares a composition of the reference and one of the present invention having the same burn time in the UL-94 vertical burn test. The inclusion of more than 13% antimony oxide and other additives destroys the physical properties of the resin.

The composition of U.S. Pat. No. 4,021,406 has a Gardner impact of less than 0.6 Joules, a very brittle composition which is not acceptable commercially. The invention composition containing 21.5% TTBP has a Gardner value greater than 8 Joules.

U.S. Pat. No. 4,021,406 also teaches that the ABS comparative composition containing 38 phr of total flame retardant results in only a V-1 UL-94 rating and that 46 phr of additives are needed for a V-0 rating. The latter is illustrated as the inventive comparison in Table X. In the present invention only 32.6 phr of additives are required for an V-0 product. The composition in Table X is given in percent as well as phr.

Example 10

Example 9 (ABS resin) was repeated comparing Great Lakes Chemical Company's FF-680® brand of bis(tribromophenoxy)ethane, the industry standard, and TDBP with 3% and 4% antimony oxide. The results are presented as Table XI. The table illustrates the superior performance of the TDBP to commercial compositions with respect to burn time and oxygen index in blends containing ABS. Another advantage of TDBP is that FF-680 plated out on the mold while the claimed flame retardant additive did not.

Example 11

Glass-filled (30%) flame retardant polyethylene terephthalate (PET) resins formulated with TDBP brominated phosphate were superior to a commercial Pyrochek 68PB® brominated polystyrene/sodium antimonate combination (Table XII). Surprisingly, it shows sodium antimonate is not required in brominated phosphate formulations; the conventional brominated polystyrene requires costly sodium antimonate as a synergist. In a separate test the resin with 19% brominated polystyrene alone burned in the UL-94 test.

Example 12

Compositions of Rynite 530® brand of polyethylene terephthalate (PET) were compounded as indicated in Table XIII and the oxygen index and UL-Vertical Test parameters determined. The results show that TDBP alone is more effective on a weight basis than TDBP plus antimony provided as sodium antimonate. Commercial PET systems require sodium antimonate.

Example 13

A blend of 45 parts Lexan 141® polycarbonate resin, 45 parts Valox 325® polybutylene terephthalate (PBT), 0.5 parts Teflon powder and 14 parts TDBP were evaluated without any antimony compound. The oxygen index was 33.0 and the UL-94 rating was V-0 with a burn time of 0.9 sec. The blend containing 14 parts of the brominated polycarbonate oligomer (BC-58) burns as shown in Table XIV. This shows that with compositions containing essentially the same bromine content (8.14 and 8.4%) TDBP is superior to the brominated polycarbonate.

Example 14

Various blend ratios of polycarbonate and PBT polyester were flame retarded with TDBP brominated phosphate, brominated polystyrene, and brominated polycarbonate (Table XV). Brominated phosphate showed an unexpectedly large synergistic effect. In these blends it was the most efficient; brominated polycarbonate was the least efficient flame retardant as shown by the oxygen index. At 50% and greater flame retardant concentration, the brominated phosphate is significantly more effective than brominated polystyrene.

Example 15

The flame retardant performance of various flame retardant additives in a commercial polycarbonate/ABS alloy were compared. The data show the brominated phosphate to be a highly efficient flame retardant in this alloy (Table XVI). An alloy composition containing 14% brominated phosphate and no antimony oxide gives a V-0 rating (Table XVII). The melt index of this same alloy containing 12% brominated polystyrene was 7.6 g/10 minutes (at 250° C.); the equivalent resin containing TDBP brominated phosphate had a melt index of 13.3 g/10 minutes, the latter would be expected to be easier to inject mold.

TABLE I

COMPARISON OF FLAME RETARDANTS

|  | Wt. % Br/P | °C. Melt/ Soft | Solubility in Toluene g/100 g | Color at 300° C. for 30 min. |
|---|---|---|---|---|
| Br Polystyrene | 68/0 | 215–225 | <1 | Brown |
| Br Polycarbonate Oligomer | 58/0 | 230–260 | 7 | Water White |
| Br Phosphate TDBP | 60/4 | 110 | 25 | Water-White |

TABLE II

COMPARISON OF OXYGEN INDEX OF TRIS(2,4-DIBROMOPHENYL) PHOSPHATE (TDBP) AND BC-58 OLIGOMER IN POLYCARBONATE

| % Concentration of Flame Retardant | Oxygen Index | |
|---|---|---|
|  | TDBP | BC-58 |
| 2 | 28 | 28 |
| 4 | 31 | 29 |
| 6 | 35 | 30 |
| 8 | 40* | 31 |

*greater than 39.6, the maximum of the instrument scale

TABLE III

FLAME RETARDING POLYCARBONATE RESIN

| Lexan 141 | 93 | 93 | 93 | 97 |
|---|---|---|---|---|
| Br Polycarbonate | 7 | — | — | — |
| TDBP | — | 7 | — | 3 |
| TTBP | — | — | 7 | — |
| Teflon Powder, 6C | — | — | — | 0.2 |
| Oxygen Index | 32.1 | >39.6 | 32.4 | 35.4 |
| UL-94, Rating | V-0 | V-0 | V-0 | V-0 |
| UL-94, Time, Sec. | 3.8 | 2.4 | 4.7 | 0.9 |
| Heat Distortion Temp. |  |  |  |  |
| @ 1.82 mPa °C. | 127 | 115 | 129 | 135 |
| Gardner Impact J | >16 | >16 | >16 | >16 |
| Spiral flow, Inj. |  |  |  |  |
| Molding, inches | 23.5 | 29.5 | — | 24 |

TABLE IV

FLAME RETARDANT POLYCARBONATE RESIN

| FR Polycarbonate (Sulfonate Salt) | 100 | 99 | 97 |
|---|---|---|---|
| TDBP | — | 1 | 3 |
| Oxygen Index | 33.6 | 34.8 | 37.5 |
| UL-94 |  |  |  |
| @ 1/16" Rating | V-0 | V-0 | V-0 |
| Sec. | 1.2 | 1.9 | 0.9 |
| @ 1/32" Rating | V-2 | V-2 | V-0 |
| Sec. | 4.7 | 2.4 | 1.4 |
| Melt Index, g/10 min. (250° C.) | 7.0 | — | 9.1 |

TABLE V

FLAME RETARDING POLYCARBONATE/ PET POLYESTER ALLOY

| Polycarbonate/PET Alloy | 90 | 86 | 90 | 86 | 90 | 86 |
|---|---|---|---|---|---|---|
| Brominated Polycarbonate (BC-58) | 10 | 12 | — | — | — | — |
| Brominated Polystyrene | — | — | 10 | 12 | — | — |
| Brominated Phosphate (TDBP) | — | — | — | — | 10 | 12 |
| Teflon 6C | 0.5 | 0.5 | 0.5 | 0.5 | 0.5 | 0.5 |
| Oxygen Index | 27.3 | 27.9 | 30.6 | 30.9 | 31.2 | 35.4 |
| UL-94, Rating (1/16") | V-1 | V-1 | V-0 | V-0 | V-0 | V-0 |
| sec. | 11.3 | 6.1 | 1.0 | 2.7 | 4.9 | 2.3 |
| Melt Index, g/10 min.* (275° C.) | — | 20 | — | 37 | — | 71 |

*Virgin resin — 24 g/10 min.

TABLE VI

FLAME RETARDING POLYCARBONATE/PET POLYESTER ALLOY — GLASS FILLED

| | | | |
|---|---|---|---|
| Polycarbonate/PET Alloy (10% Glass) | 90 | 86 | 82 |
| TDBP | 10 | 14 | 18 |
| Teflon 6C | 0.5 | 0.5 | 0.5 |
| Oxygen Index | 34.8 | 36.6 | >39.6 |
| UL-94, Rating | V-0 | V-0 | V-0 |
| Sec. | 1.9 | 2.5 | 0 |

44/44 PC/30% glass filled PET blend plus 12% TDBP gives a UL-94 rating of V-0/0.9 sec. and 36.9 O.I.

TABLE VII

FLAME RETARDING MINERAL-FILLED PBT

| | | | | |
|---|---|---|---|---|
| Valox 745% | 84 | 84 | 84 | 84 |
| Br Polycarbonate % | 12 | — | 16 | — |
| TDBP % | — | 12 | — | 16 |
| Antimony Oxide % | 4 | 4 | — | — |
| Oxygen Index | 31.8 | 29.7 | 29.1 | 31.2 |
| UL-94, Rating | V-0 | V-0 | Burns | V-0 |
| UL-94, Time, Sec. | 0 | 3.7 | — | 3.1 |

TABLE VIII

FLAME RETARDANT GLASS FILLED POLYBUTYLENE TEREPHTHALATE

| | Control | 1* | 2 | TDBP |
|---|---|---|---|---|
| PBT-30% Glass | 100 | 87.5 | 87.5 | 86.5 |
| Teflon 6C | — | 0.5 | 0.5 | 0.5 |
| Antimony Oxide | — | 2.5 | 2.5 | 3.5 |
| Br Polystyrene | — | 10 | — | — |
| Br Polycarbonate (BC-58) | — | — | 10 | — |
| Br Phosphate (TDBP) | — | — | — | 10 |
| Bromine/Phosphorus of FR, wt. % | — | 68/0 | 58/0 | 60/4 |
| Oxygen Index | 20.7 | 26.7 | 28.5 | 28.5 |
| UL-94 rating (1/16") | B | V-0 | V-0 | V-0 |
| sec. | — | 2.6 | 0 | 0 |
| Izod Impact, Notched | 1.32 | 0.80 | 1.07 | 1.26 |
| Deflection temp., °C. | 207 | 205 | 201 | 201 |
| Melt Index g/10 min. | 13.4 | 16.0 | 11.6 | 19.1 |
| Spiral Flow, in. | 37 | 36 | 26 | 35 |
| Tensile Strength | 17,100 | 11,600 | 15,600 | 15,400 |
| Elongation | 3.9 | 2.3 | 3.3 | 4.5 |
| Flex. Strength, psi | 29,420 | 20,900 | 28,350 | 28,790 |
| Flex. Modulus, × 10⁶, psi | 1.20 | 1.20 | 1.20 | 1.06 |
| Extruder | | | | |
| Torque (g-m) | 8,800 | 9,000 | 11,000 | 3,000 |
| Head Pressure (psig) | 285 | 380 | 430 | 420 |
| Viscosity at 2100 sec⁻¹ of shear rate (poise) | 890 | 413** | 893 | 375 |

*discolored
**some degradation noted

TABLE IX

FLAME RETARDING GLASS-FILLED PBT

| | | |
|---|---|---|
| Valox 420 | 82.5 | 82.5 |
| Br Polycarbonate BC-58 | 14 | — |
| TDBP | — | 14 |
| Antimony Oxide | 3.5 | 3.5 |
| Teflon Powder | 1.0 | 1.0 |
| Oxygen Index | 33.3 | 30.6 |
| UL-94, Rating | V-0 | V-0 |
| UL-94, Time, Sec. | 0 | 0 |
| Heat Distortion Temp. @ 1.82 MPa °C. | 192 | 188 |

TABLE X

ABS RESIN COMPARISON WITH U.S. Pat. No. 4,021,406

| | TTBP | | U.S. Pat. No. 4,021,406 | |
|---|---|---|---|---|
| | % | phr | % | phr |
| ABS Resin | 75 | 100 | 68.5 | 100 |
| Dechloran | — | — | 17.1 | 25 |
| TTBP | 21.5 | 28.6 | 5.5 | 8 |
| Antimony Oxide | 3 | 4 | 8.9 | 13 |
| Heat Deflection Temp. @ 1.82 MPa °C. | 69 | | 72 | |
| Impact — Gardner J | 8.75 | | <0.6 | |
| Oxygen Index | 34.2/35.1 | | 34.2 | |
| UL-94-Vert. Rating | V-0 | | V-0 | |
| UL-94-Av. Burn, Sec. | 0.2/0.9 | | 0.2 | |

TABLE XI

COMPARISON OF ABS FORMULATION WITH BIS(TRIBROMOPHENOXY)ETHANE (FF-680) AND TDBP

| | | | |
|---|---|---|---|
| ABS Resin | 75.5 | 75.5 | 74.5 |
| FF 680 | 21.5 | — | — |
| TDBP | — | 21.5 | 21.5 |
| Antimony Oxide | 3 | 3 | 4 |
| HDT @ 1.82 MPa, °C. | 66 | 66 | 64 |
| Oxygen Index | 27.3 | 28.5 | 29.7 |
| UL-94-Vert. Burn Rating | V-0 | V-0 | V-0 |
| Av. Burn, Sec. | 3.2 | 0.85 | 1.6 |
| Plateout on Mold | Yes | No | No |

TABLE XII

FLAME RETARDANT PET RESINS

| | | | |
|---|---|---|---|
| PET/30% glass | 81 | 81 | 80 |
| Br Polystyrene | 15 | — | — |
| TDBP | — | 19 | 15 |
| Na Antimonate | 4 | — | 4 |
| Oxygen Index | 31.1 | 32.7 | 29.4 |
| UL-94, rating (1/16") | V-0 | V-0 | V-2 |
| sec. | 0 | 0.1 | 5.1 |

TABLE XIII

FLAME RETARDING POLYETHYLENE TEREPHTHALATE (PET)

| | | | |
|---|---|---|---|
| Rynite 530 (PET) % | 82 | 80 | 82 |
| Teflon Powder % | 1 | 1 | 1 |
| TDBP % | 18 | 20 | 14 |
| Sodium Antimonate % | — | — | 4 |
| Oxygen Index | 32.1 | 35.7 | 30.0 |
| UL-94, Rating | V-1 | V-0 | Burn |
| UL-94, Time, Sec. | 7.6 | 2.9 | |

TABLE XIV

FLAME RETARDING POLYCARBONATE/PBT BLEND

| Polycarbonate | 45 | 45 |
|---|---|---|
| PBT | 45 | 45 |
| Br Polycarbonate | 14 | — |
| TDBP | — | 14 |
| Teflon Powder | 0.5 | 0.5 |
| Oxygen Index | 24.8 | 33.0 |
| UL-94, Rating | Burns | V-0 |
| UL-94, Time, Sec. | — | 0.9 |

TABLE XV

OXYGEN INDEX OF POLYCARBONATE/PBT BLENDS WITH 12% FR ADDITIVE SHOWING SYNERGISTIC EFFECT OF TDBP

| | Oxygen Index | | |
|---|---|---|---|
| Resin | Br Polycarbonate | Br Polystyrene | Br Phosphate (TDBP) |
| 25% polycarbonate/ 75% PBT | 22 | 25 | 25 |
| 50% polycarbonate/ 50% PBT | 25 | 26 | 28 |
| 75% polycarbonate/ 25% PBT | 28 | 29 | 32 |

TABLE XVI

FLAME RETARDING POLYCARBONATE/ABS ALLOY

| Polycarbonate/ABS Alloy | 82.5 | 82.5 | 82.5 | 82.5 |
|---|---|---|---|---|
| Teflon 6C | 0.5 | 0.5 | 0.5 | 0.5 |
| Brominated Polycarbonate | 17.5 | — | — | — |
| bis-(tribromophenoxy)-ethane | — | 17.5 | — | — |
| Brominated Polystyrene | — | — | 17.5 | — |
| TDBP | — | — | — | 17.5 |
| Oxygen Index | 26.4 | 27.0 | 27.0 | 28.2 |
| UL-94, Rating (1/16") | V-1 | V-0 | V-0 | V-0 |
| Sec. | 22 | 2.0 | 2.6 | 1.4 |

TABLE XVII

FLAME RETARDING POLYCARBONATE/ABS ALLOY

| Polycarbonate/ABS Alloy | 86 | 86 | 86 |
|---|---|---|---|
| Brominated Polystyrene | 10 | — | — |
| TDBP | — | 10 | 14 |
| Antimony Oxide | 4 | 4 | — |
| Oxygen Index | 27.0 | 26.1 | 25.8 |
| UL-94, Rating (1/16") | V-0 | V-0 | V-0 |
| Sec. | 0.8 | 0.1 | 1.3 |

I claim:

1. A flame retardant thermoplastic composition comprising a resin selected from the group consisting of polycarbonate, polybutylene terephthalate, polyethylene terephthalate, and blends and alloys of polycarbonate with one or more of polybutylene terephthalate, polyethylene terephthalate and acrylonitrile-butadiene-styrene, and a flame retarding amount of a melt-blendable, solid polybrominated triphenyl phosphate ester selected from a group consisting of tris(dibromophenyl)phosphate and bis(tribromophenyl)phenyl phosphate providing a thermally-stable thermoplastic composition not subject to plateout, having good impact properties, and good processability.

2. The composition of claim 1 wherein the polybrominated triphenyl phosphate ester is tris(2,4-dibromophenyl)phosphate.

3. The composition of claim 1 wherein the polybrominated triphenyl phosphate is bis(2,4,6-tribromophenyl)phenyl phosphate.

4. The composition of claim 1 wherein the resin is polycarbonate with from 2% to 30% by weight polybrominated triphenyl phosphate with no antimony oxide.

5. The composition of claim 1 wherein the resin is polybutylene terephthalate with from 2% to 30% by weight polybrominated triphenyl phosphate and from 0% to 5% by weight antimony oxide.

6. The composition of claim 1 wherein the resin is polyethylene terephthalate with from 2% to 30% by weight polybrominated triphenyl phosphate and from 0% to 4 by weight sodium antimonate.

7. The composition of claim 1 wherein the resin is polycarbonate-polybutylene terephthalate with from 2% to 30% by weight polybrominated triphenyl phosphate less than 4% by weight sodium antimonate.

8. The composition of claim 1 wherein the resin is polycarbonate-acrylonitrile-butadiene-styrene with from 2% to 30% by weight polybrominated triphenyl phosphate less than 4% by weight antimony oxide.

9. The composition of claim 1 wherein the resin is polycarbonate-polyethylene terephthalate with from 2% to 30% by weight polybrominated triphenyl phosphate less than 4% by weight antimony oxide.

* * * * *